(12) United States Patent
Adriansens

(10) Patent No.: US 6,578,604 B1
(45) Date of Patent: Jun. 17, 2003

(54) BALL VALVE WITH SLOT FOR CONTINUOUS FLOW

(75) Inventor: Eric Adriansens, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 09/806,570

(22) PCT Filed: Jul. 24, 2000

(86) PCT No.: PCT/FR00/02126

§ 371 (c)(1),
(2), (4) Date: May 14, 2001

(87) PCT Pub. No.: WO01/09028

PCT Pub. Date: Feb. 8, 2001

(30) Foreign Application Priority Data

Aug. 3, 1999 (FR) .............................. 99 10161

(51) Int. Cl.⁷ ................................. E03B 1/00
(52) U.S. Cl. ................. 137/614.2; 137/512.3; 137/512.5; 137/522; 251/129.1
(58) Field of Search ............... 137/614.2, 613, 137/512, 513.5, 513.3, 522; 251/129.7, 129.14

(56) References Cited

U.S. PATENT DOCUMENTS

| | | | |
|---|---|---|---|
| 1,757,059 A | * 5/1930 | Rickenberg | ............ 251/129.14 |
| 3,443,585 A | * 5/1969 | Reinicke | ................ 251/129.14 |
| 3,665,907 A | 5/1972 | Laufer | |
| 4,192,338 A | * 3/1980 | Gerulis | ........................ 137/106 |
| RE31,480 E | * 1/1984 | Major | .......................... 137/544 |
| 4,511,118 A | 4/1985 | Kuehl et al. | |
| 4,674,536 A | * 6/1987 | Warrick | .................. 137/614.19 |
| 5,406,978 A | * 4/1995 | Smolong | ............... 137/516.25 |
| 5,492,449 A | 2/1996 | Hunklinger et al. | |
| 5,878,992 A | 3/1999 | Summers et al. | |
| 6,095,188 A | * 8/2000 | Anderson et al. | ...... 137/596.17 |

FOREIGN PATENT DOCUMENTS

| | | |
|---|---|---|
| CH | 626 972 | 12/1981 |
| DE | 23 21 206 | 5/1974 |
| GB | 447 359 | 5/1936 |

* cited by examiner

*Primary Examiner*—A. Michael Chambers
(74) *Attorney, Agent, or Firm*—Sughrue Mion, PLLC

(57) ABSTRACT

The invention concerns a device for controlling a fluid flow, characterised in that said device comprises second valve arrangement means interposed in the circuit in series with first valve arrangement means (20, 22, 34), and wherein a second mobile closure element (38) moves between a pressing position, wherein it is pressed on the seat (32) of a second threshold (30) and an opening position wherein the second closure element (38) is spaced apart from the second seat (32) to allow the fluid through the second threshold (30), and in pressing position, the second closure element (38) allows a reduced flow of the fluid through the second threshold (30).

10 Claims, 3 Drawing Sheets

BALL VALVE WITH SLOT FOR CONTINUOUS FLOW

The invention concerns the field of devices suitable for controlling the flow of a fluid in a system, and particularly those devices designed to be used in facilities for filling containers.

In container filling machines, it is advantageous to be able to have several flows of fluid, particularly in order to be able to accelerate filling in spite of the foam creation phenomenon. Indeed, when the filling flow is fast, which enables a given volume of product to be filled quickly, the appearance of foam is inevitably observed. This becomes particularly troublesome at the end of filling because the foam causes an overflow of the product, resulting not only in a loss of product, but above all, an ambiguity about the quantity of product that the container actually holds at the end of filling. Obviously, the formation of foam is much less significant if the fill flow is reduced, but this increases the time required for the fill.

It thus appears particularly advantageous to fill the container in two phases. In a first phase, the speed of fill is favored, using a fast flow of fluid without concern for the foaming problem of the product. In a second phase, a slower flow is used to enable any foam that may have been created during the first phase to be reabsorbed and to reach the desired level of fill, either in terms of weight of product, or in terms of volume or height of fill, with the greatest possible precision.

Such a filling procedure requires the use of a means of valve regulation capable of determining at least two different flows of fluid in the system.

One possible solution consists of using a proportional valve that can be controlled to determine a first flow, then a second flow. However, compared to the control electronics of an "all or nothing" controlled valve, the electronics for a proportional valve are relatively complex and therefore costly. Most filling machines are machines that have a large number of filling stations, each of which must be fitted with its own means of valve regulation. Thus, for machines with several dozen stations-even a hundred stations—the use of proportional valves is not economically advantageous.

A first object of the invention is therefore to propose a flow control device for fluid, capable of determining two levels of flow. The device must be simple in construction and simple in operation.

To that end, the invention proposes a flow control device for fluid, of the type having valve regulation means that are provided with a threshold through which the fluid circulates, and a movable stop plug that moves inside the chamber between a seated position, in which it rests on the seat to interrupt the passage of fluid through the threshold, and an open position, in which the stop plug is separated from its seat to enable the passage of the fluid through the threshold, characterized in that the device has a second valve regulation means placed in the system in series with the first means of valve regulation, and in which a second movable stop plug moves between a seated position, in which it rests on the seat of a second threshold, and an open position, in which the second stop plug is separated from the second seat to allow the passage of the fluid through the second threshold, and in which, in the seated position, the second stop plug allows the passage of a reduced flow of fluid through the second threshold.

According to other characteristics of the invention:

- at least one of the two stop plugs moves between its seated position and its open position under the effect of a magnetic field;
- the stop plug moves vertically between its seated position and its open position;
- the seated position of the stop plug corresponds to its lower position; it is drawn and held in its upper open position by an electromagnet, and it returns to its seated position under the action of its own weight;
- the seated position of the stop plug corresponds to its upper position; it is drawn and held in its lower open position by an electromagnet, and returns and is held in its seated position under the action of a permanent magnet;
- the fluid flows in the system in the direction of the movement of the stop plug from its open position to its seated position;
- the stop plug is in the shape of a ball and is made from a magnetic material;
- the seat of the second means of valve regulation is perforated in such a way as to allow a small section to remain for the fluid to pass through when the stop plug is in the seated position; and
- both valve regulation means are built into the same valve body.

The invention also concerns a machine for filling containers, characterized in that it has a device for controlling a flow of fluid that incorporates any one of the preceding characteristics.

Other characteristics and advantages of the invention will appear in the following detailed description, as well as in the appended drawings in which.

In FIGS. 1 to 4, a valve 10 is represented that is designed to be installed, for example, in a container filling facility. The valve 10 is therefore designed to be placed in a feed system between a storage unit for the fluid and at least one filling nozzle. In such a machine, a container is brought to the nozzle and the valve 10 is opened to allow the product to pass. When the container is full, the valve 10 is closed again.

As will be seen in the following, the valve 10 is particularly suited for use in the field of filling alimentary liquids.

The valve 10 has a generally tubular structure. At its center, it has a cylindrical control chamber 16 which is delimited by a central tube 18 with axis A1.

Figures 1, 2, 3:
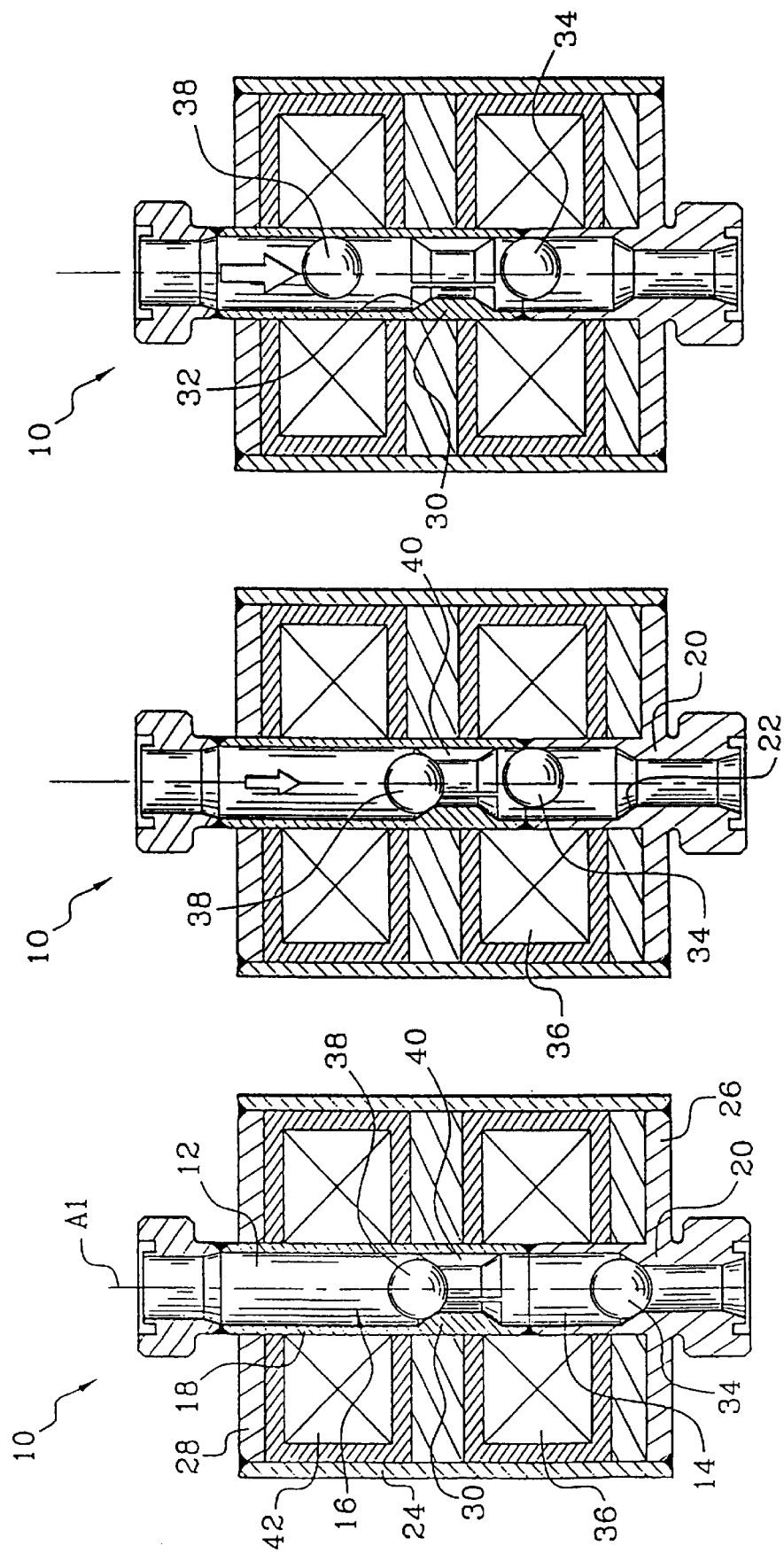
FIGS. 1 to 3 are cross-sectional diagrammatic views of a two-ball valve capable of determining two discreet flows, the valve being represented respectively in the closed position, in the low flow position and in the full flow position.
Figure 4:
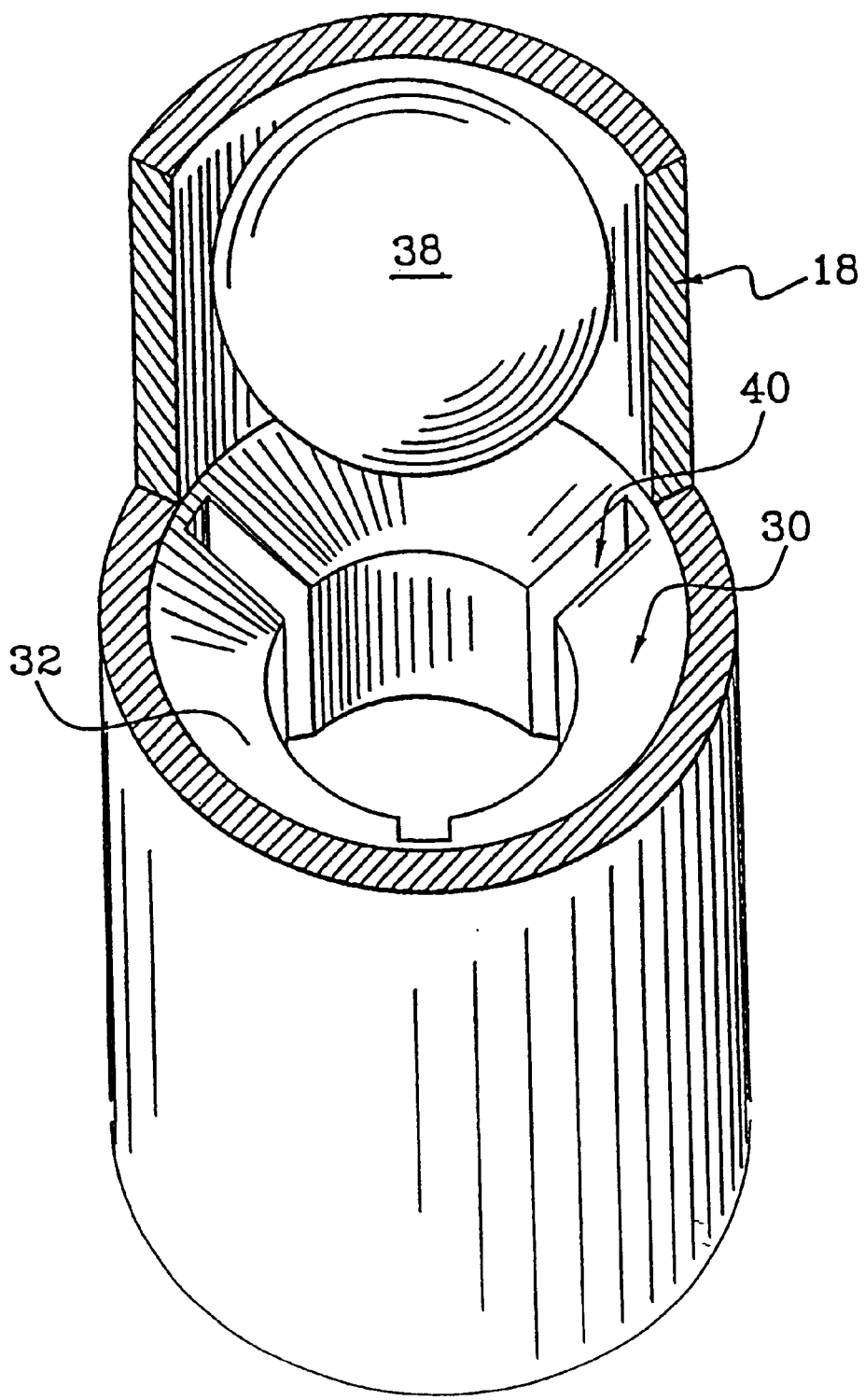
FIG. 4 is a cutaway diagrammatic view in perspective illustrating the second valve regulation means of the valve of FIG. 1.

In the example illustrated in FIGS. 1 to 3, the upper and lower ends of the chamber 16 are connected respectively to upstream and downstream sections of the feed system, the fluid being thus designed to flow from top to bottom in the valve 10 which is preferably arranged vertically, and in any case in the direction illustrated in FIGS. 1 to 3.

The lower end of the chamber 16 is in the form of a first threshold 20 formed by a restriction of diameter. The threshold thus has a conical portion 22 which is designed to form a first seat and which is extended downward by a cylindrical portion of a diameter smaller than that of the chamber 16. In this first example of embodiment, the first threshold 20 is therefore located at the downstream end of the valve.

The valve 10 has a tubular external sleeve 24 with axis A1 which is arranged coaxially around the tube 18. The diameter of the tube 18 and that of the sleeve 24 are designed in such a way that there is a tubular internal space between them. Two transverse plates 26, 28 close off the internal space upwards and downwards.

According to the invention, the valve 10 has a second threshold 30, formed in a similar manner by a restriction of diameter. The threshold 30 thus has a conical portion 32 that is designed to form a second seat and which is extended downward by a cylindrical portion of a diameter that is smaller than that of the chamber 16. In the example illustrated, the second threshold 30 is located at mid-height in the chamber 16 in such a way that it divides said chamber into an upstream part 12 and a downstream part 14.

A movable stop plug, which enables the flow of fluid through the respective threshold to be controlled, is associated with each of the two thresholds 20, 30. In both cases, a magnetic material was chosen to make the ball-shaped stop plug, which is controlled by an electromagnetic coil wound around the tube 18 inside the space delimited between the tube 18 and the sleeve 24.

Thus, a first ball 34 is placed in the downstream part 14 of the chamber 16. The ball 34 has a diameter that is smaller than that of the chamber 16, but greater than that of the restriction of diameter of the associated threshold 20. Under the effect of its own weight alone, the ball 34 falls to rest on the seat 22 of the first threshold 20, thus sealing off any passage of liquid through the first threshold 20. A first coil 36 is placed in the internal space at the level of the downstream part 14 of the chamber 16. When electricity is applied, the coil 36 creates an electromagnetic field that attracts the first ball 34 to an open position by raising it from its seat 22, thus breaking the seal and allowing the fluid to circulate through the first threshold 20.

The first ball 34, the first threshold 20 and the first coil 36 thus form the first valve regulation means which are controlled in an "all or nothing" manner to permit or interrupt the passage of the fluid.

In a similar way, a second ball 38 is placed into the upstream part 12 of the chamber 16 in such a way that it also, under the effect of its own weight alone, comes to rest on the seat 32 of the second threshold 30. Moreover, a second coil 42 is arranged in the internal space at the level of the upstream part 12 of the chamber 16 so that, when electricity is applied thereto, it creates an electromagnetic field capable of attracting the second ball 38 to an open position by lifting it from its seat 32.

However, unlike the first threshold 20, the seat 32 of the second threshold 30 is perforated. Indeed, as can be seen in FIGS. 1 to 4, the second threshold 30 has three radial grooves 40 that extend axially through the restriction of diameter forming the second threshold 30. Each of these grooves 40 extends radially outward with respect to the axis A1 of the valve 10, beyond the line of contact between the second ball 38 and the seat 32. Since they open axially upward in the seat 32 and they also open downward in the direction of the downstream part of the chamber 16, the grooves 40 form a residual passage for the fluid even when the second ball 38 is resting on its seat 32. Thus, the second ball 38, the second threshold 30 and the second coil 42 form second valve regulation means that determine a first level of flow of fluid through the second threshold when the second ball 38 is not in the seated position, and that determine a second level of flow, smaller than the first, when the second ball 38 is in the seated position.

Of course, the seat 32 of the second threshold 30 could be perforated in different ways.

The operation of the valve 10 according to the invention is therefore as follows.

FIG. 1 illustrates the valve in closed condition. Indeed, neither of the two coils 36, 42 has electricity applied, while each of the balls 34, 38 is in the seated position on their respective seats. In this situation, the first valve regulation means 20, 34 prevent any circulation of fluid through the valve 10.

In FIG. 2, it can be seen that electricity is applied to the first coil 36 in such a way as to attract the first ball 34 to its open position, while the second ball 38 remains in the seated position. In this case, the fluid can freely circulate through the first threshold 20, but the flow of fluid is limited by the small diameter of passage available to it through the second threshold 30 when the second ball is seated. The two valve regulation means being arranged in series in the valve, the flow through the valve can not exceed the residual flow through the second threshold 30. Thus, in this condition, the valve allows a small flow of fluid to pass.

When both coils 36, 42 are energized, both balls 34, 38 are in the open position in such a way that the fluid can circulate freely through both thresholds 20, 30. The flow of fluid through the valve is then limited by the smaller diameter of passage in the tube 18; this minimal diameter, for example, can be the free diameter around the balls in the open position. In any case, this diameter will enable a second flow of fluid to be obtained through the valve that is noticeably greater than the single small flow rate in the case of FIG. 2.

The valve according to the invention is therefore particularly simple in its structure as well as in its method of control. Moreover, it is a particularly safe valve because it is of the normally closed type; so, in case of power failure, the valve closes and prevents any undesired flow of fluid.

Figure 5:
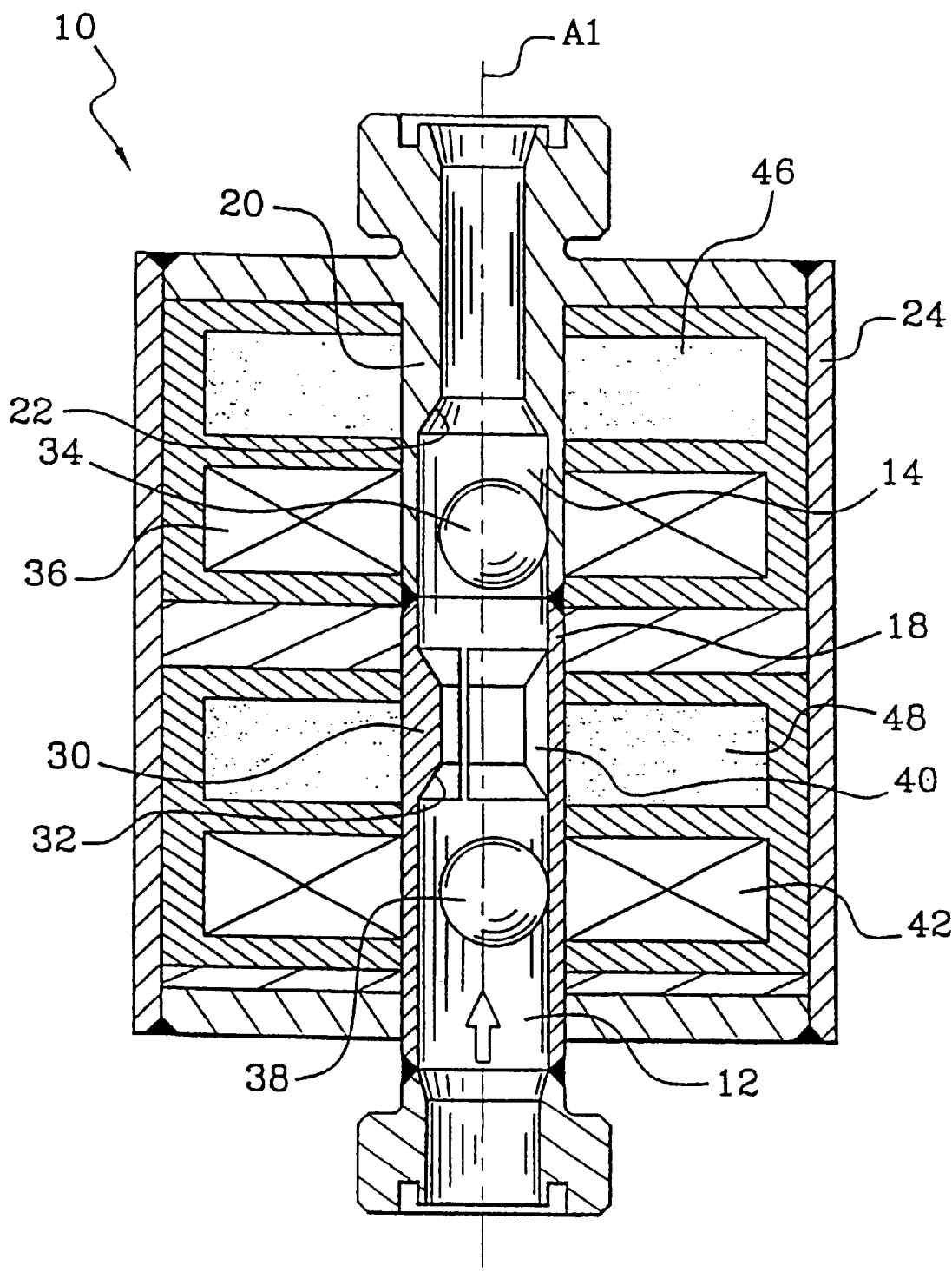
FIG. 5 is a cross-sectional view of one variant of embodiment of the invention.

FIG. 5 illustrates a variant of embodiment of the valve 10 which is adapted to operate upside down.

In effect, this valve is substantially identical to the previous one, except that it is vertically reversed. Thus, the first and second thresholds 20, 30 are no longer located at the lower end, but now at the upper end of the upstream 12 and downstream 14 parts of the chamber 16, with the understanding that the fluid circulates from the bottom to the top through the valve.

Because of this, it is no longer possible to count on the weight of the balls to return them to their seated position. Also, the valve is modified by the addition of two annular permanent magnets 46, 48 that are placed in the internal space delimited between the tube 18 and the sleeve 24 of the valve 10. The two magnets are arranged essentially axially to the level of the thresholds so that each of them is in position to attract the respective ball against its seat. The two coils 36, 42 are arranged as before, upstream from the respective magnet in such a way as to attract the balls to their open position.

In this embodiment, each magnet is provided in order to draw the respective ball back against its seat as soon as the associated coil ceases to be energized. Of course, once seated, the ball is held there solely by the action of the magnet which, in this case, must counter the action of the weight of the ball. Also in this variant, the valve is of the normally closed type.

In both cases, it can be seen that the valve is designed to function with a fluid that circulates in the valve in such a way that its action on the ball tends to bring it back against its seat.

Moreover, in both examples of embodiment proposed, the first valve regulation means, which are the only ones that can close the valve and seal it, are arranged downstream from the second means of valve regulation with respect to the direction of circulation of the fluid. However, the opposite could also be provided.

The valves that have just been described are valves in which the two stop plugs are remotely controlled electromagnetically without being connected to any component whatever outside the system. Thus, perfect isolation between the interior and exterior of the system is guaranteed, making it possible to avoid any contamination of the fluid during filling. In addition, this enables a perfect cleaning of the fluid distribution system, thus making these valves particularly well suited to filling for alimentary liquids.

What is claimed is:

1. A device to control a flow of fluid, comprising:

first valve regulation means having a first threshold through which the fluid circulates, and a first movable stop plug that moves inside a chamber between a first seated position, in which the first movable stop plug rests on a first seat to interrupt passage of the fluid through the first threshold, and a first open position, in which the first movable stop plug is separated from the first seat to enable passage of the fluid through the first threshold; and second valve regulation means having a second threshold and a second movable stop plug;

wherein the second valve regulation means are placed in series with the first valve regulation means;

wherein the second movable stop plug moves between a second seated position, in which the second movable stop plug rests on a second seat of the second threshold, and a second open position, in which the second movable stop plug is separated from the second seat to allow for passage of the fluid through the second threshold; and wherein, in the second seated position, the second movable stop plug allows for passage of a reduced flow of the fluid through the second threshold.

2. The device according to claim 1, wherein at least one of the first movable stop plug and the second movable stop plug moves between a respective one of the first seated position and the second seated position and a respective one of the first open position and the second open position under the effect of a magnetic field.

3. The device according to claim 1, wherein at least one of the first moveable stop plug and the second moveable stop plug moves vertically between a respective one of the first seated position and the second seated position and a respective one of the first open position and the second open position.

4. The device according to claim 3, wherein the respective one of the first seated position of the first movable stop plug and the second seated position of the second movable stop plug corresponds to a lower position of the first movable stop plug and the second movable stop plug;

wherein an electromagnet is configured to pull and hold a respective one of the first movable stop plug and the second movable stop plug in an upper position; and wherein a weight of the respective one of the first movable stop plug and the second movable stop plug effects return to the respective one of the first seated position and the second seated position.

5. The device according to claim 3, wherein the respective one of the first seated position and the second seated position corresponds to an upper position of the first and second movable stop plugs;

wherein an electromagnet is configured to pull and hold a respective one of the first movable stop plug and the second movable stop plug in a lower position; and wherein a permanent magnet is configured to effect returning of the first movable stop plug and the second movable stop plug to the respective one of the first seated position and the second seated position and holding of the first movable stop plug and the second movable stop plug in the respective one of the first seated position and the second seated position.

6. The device according to claim 1, wherein the fluid flows in a direction of movement of the first movable stop plug and the second movable stop plug from a respective one of the first open position and the second open position to a respective one of the first seated position and the second seated position.

7. The device according to claim 2, wherein the first movable stop plug and the second movable stop plug are ball-shaped and made from a magnetic material.

8. The device according to claim 1, wherein the second seat of the second valve regulation means is perforated in such a way so as to allow a small section to remain for the fluid to pass through when the second movable stop plug is in the second seated position.

9. The device according to claim 1, wherein the first valve regulation means and the second valve regulation means are built into the same valve body.

10. A machine for filling containers, comprising at least one device for controlling a flow of fluid in accordance with claim 1.

\* \* \* \* \*